United States Patent [19]
Oh et al.

[11] 3,980,773
[45] Sept. 14, 1976

[54] RUMINANT REPELLENT FROM FRESH LIPOIDAL MATERIAL
[75] Inventors: John H. Oh; Katashi Oita, both of Seattle, Wash.
[73] Assignee: Weyerhaeuser Company, Tacoma, Wash.
[22] Filed: June 10, 1974
[21] Appl. No.: 477,859

[52] U.S. Cl. ................................ 424/95; 424/195
[51] Int. Cl.² .................. A61K 35/12; A61K 35/56
[58] Field of Search .................. 424/95, 195, 84

[56] References Cited
UNITED STATES PATENTS

| | | | |
|---|---|---|---|
| 659,552 | 10/1900 | Schambach | 424/341 |
| 1,081,445 | 12/1913 | Hanczewski | 424/95 |
| 1,584,173 | 5/1926 | Holzapfel | 424/318 |
| 1,960,251 | 5/1936 | Mano | 47/58 |
| 2,057,413 | 10/1936 | Bridgeman et al. | 47/58 |
| 2,171,594 | 9/1939 | Nitardy | 99/160 |
| 2,380,847 | 7/1945 | Kaufman | 195/3 |
| 2,924,554 | 2/1960 | Manzelli et al. | 424/278 |
| 3,000,789 | 9/1961 | Bertullo | 195/29 |
| 3,041,174 | 6/1962 | Ehlert | 99/7 |
| 3,041,374 | 6/1962 | Gregory | 260/556 |
| 3,127,310 | 3/1964 | Wright, Jr. | 424/46 |
| 3,162,571 | 12/1964 | Adams et al. | 424/326 |
| 3,222,158 | 12/1965 | Sowa | 71/2.3 |
| 3,226,291 | 12/1965 | Rediske et al. | 424/203 |
| 3,258,395 | 6/1966 | Shibe, Jr. | 424/326 |
| 3,269,902 | 8/1966 | Goodhue et al. | 424/326 |
| 3,627,878 | 12/1971 | Linsner | 424/101 |

FOREIGN PATENTS OR APPLICATIONS

| | | | |
|---|---|---|---|
| 966,484 | 1957 | Germany | 424/341 |

OTHER PUBLICATIONS
Chem. Abs., 1973, vol. 78, pp. 400, 56833b.
Chem. Abs. 1971, vol. 74, pp. 255, 31085p and 31086lq.
Chem. Abs., 1959, vol. 53, p. 22718.
Armour, Forestry Extracts, 1963, vol. 24, No. 4, p. XXVII.
Eygenraam, 1957, vol. 35, p. 12, Meded. Inst. toegep-biol. Onderz. Nat.
Hauer, L. - 1969, vol. 65, No. 1, pp. 165-168, Erdesz Kutatas.
Hungarian Forest Scientifical, 1964, p. 321.
Lengyel - Erdesz Kutatas, 1967, 63 (1/3), pp. 259-269.

Primary Examiner—Dale R. Ore
Attorney, Agent, or Firm—Christensen, O'Connor, Garrison & Havelka

[57] ABSTRACT

A ruminant repellent is a composition which, when applied directly to or applied to the area surrounding edible material such as living plants, discourages ruminant animals from browsing such edible material. The ruminant repellent of the invention comprises a composition of matter containing a phospholipid as an active repellent ingredient. Phospholipids extracted from animal or plant lipoidal material contain the active repellent material which effectively discourages browsing by ruminants. Within the phospholipid fraction, lecithin and cephalin are active repellent components. Examples of phospholipid source materials which can be applied to edible material to effectively repel ruminants are unputrefied whole eggs, dried, powdered whole eggs, unputrefied egg yolk, and lipoidal material derived from ground shellfish and fish (such as shrimp or anchovy). If desired, preservatives can be added to the repellent composition to prevent or delay putrefaction in order to form a long lasting product. Some examples of preservatives which can be used are formaldehyde, benzoic acid, sodium proprionate, and inorganic salts such as sodium chloride. Alternatively, a phospholipid solvent such as isopropanol can be combined with the phospholipid source material to function both as a phospholipid extracting solvent and as a preservative. The repellent composition can be applied to edible material in pure form (with or without a preservative), but is preferably applied to or around the edible material as a minor proportion of a mixture comprising the repellent composition, a solvent for the phospholipids in the lipoidal source material, and a carrier (or diluent). Both aqueous and nonaqueous carriers can be effectively utilized.

32 Claims, No Drawings

3,980,773

RUMINANT REPELLENT FROM FRESH LIPOIDAL MATERIAL

BACKGROUND OF THE INVENTION

The present invention relates to a method for treating material normally eaten by free roaming ruminant animals or the area surrounding such material to discourage such ruminants, such as members of the deer family, from browsing the edible material.

In those agricultural industries which grow crops such as timber or food in regions adjacent to or within areas having a high ruminant animal population, the yearly loss of usable plant life to browsing or grazing by ruminants reaches staggering proportions. It has been estimated that the irreversible loss of timber resulting from ruminant browsing, either by stunting of growth or entirely killing trees, exceeds many millions of dollars per year. This loss is caused primarily by members of the deer family which browse on timber producing trees, such as Douglas fir seedlings, during the late fall and winter seasons and selectively browse on the current growth of timber producing trees in the spring and early summer seasons. The timber industry has been seeking a way to prevent such browsing by ruminants, especially members of the deer family. A variety of compositions have been tried as ruminant repellents, but only a few have met with relative success.

Among those materials which have been effectively used as ruminant repellents are the putrefied product of a mixture of egg and a lipolytic enzyme. A specific composition which has been found to be an effective repellent is oleic acid. This repellent composition and a few others can be derived from the putrefaction product of egg and a lipolytic enzyme. Although these repellent compositions are effective, the putrefaction process is rather expensive and is extremely obnoxious to those who must work with it, meets with some ecological objection, and also produces some materials which may be phytotoxic, mammalian toxic, or otherwise harmful to the ecosystem. A continuing search for effective less phytotoxic, easier-to-handle ruminant repellents has culminated in the present invention.

It is a broad object of the present invention to provide a ruminant repellent which alone or in combination with other compositions will effectively discourage browsing by ruminants of edible materials such as trees. Further objects of the present invention are to provide an inexpensive, readily available ruminant repellent, to provide a ruminant repellent which can easily be applied to edible material, to provide a repellent which is compatible with the forest ecosystem and especially which has little or no phytotoxicity or mammalian toxicity.

Other more specific objects of the present invention are to provide a ruminant repellent composition which is chemically stable in storage for long periods of time and to provide a repellent composition which can be shipped in commerce and can be stored for future use without extraordinary precautions such as special packaging, special formulation requirements, or specific handling procedures. Further objects are to provide a concentrated repellent composition meeting the foregoing requirements, while being easily dilutable with common solvents for various uses and methods of application, such as hand or aerial application to trees, and which can be combined with other repellents for insects and non-ruminant animals.

SUMMARY OF THE INVENTION

In accord with the foregoing objects, and other objects which will become apparent upon reading the ensuing specification, the present invention provides a method for discouraging ruminants from browsing upon material normally eaten by ruminants. The method comprises contacting the material or the area surrounding the material with an amount of a repellent composition, which contains a phospholipid as an active repellent ingredient, effective to discourage the ruminants from browsing the material. The phospholipid can be derived from either plant or animal sources. Although many animal sources provide an excellent source of phospholipids, the unputrefied egg (preferably chicken egg) provides an excellent amount of phospholipid relative to its original weight. In another aspect of the invention, a phospholipid source material is admixed with a solvent for lipoidal material to dissolve the lipids, including the phospholipids, from the source material. The lower aliphatic alcohols are good solvents since they will completely dissolve the lipids and since they are miscible with water. When the repellent-alcohol mixture, forming a repellent concentrate, is admixed with an aqueous or nonaqueous carrier, and a binder if desired, the phospholipids will be completely dispersed through the carrier resulting in an evenly distributable and economical repellent formulation.

DESCRIPTION OF PREFERRED EMBODIMENTS

Definition of terms

The following paragraphs will define certain of the terms utilized in the present specification. These definitions are not exclusive, but are intended to be used as a guide to one of ordinary skill in the art in understanding, making and using the invention. The term "lipid" as used herein includes neutral lipids, phospholipids, and cholesterol and its esters. The neutral lipids include fats and oils, which yield fatty acids and glycerol upon hydrolysis. The phospholipids, yield fatty acids, glycerol, phosphoric acid, and nitrogenous compounds upon hydrolysis. The term "lipoidal material" is a mixture, chemical complex or other composition of matter which contains lipids in their naturally occurring form. "Animal lipoidal material" is lipoidal material derived from an animal source. For purposes of description in the specification and for purposes of the appended claims, the terms "lipid" and "lipoidal material" shall always include phospholipid components.

The term "repellent" or "repellent composition" as used herein is a composition of matter, including mixtures, which effectively repels or discourages animals from foraging or browsing upon edible materials. The term "edible materials" is used herein primarily to mean plant or vegetable matter which is normally eaten and digested by animals. The term "ruminant" includes those animals such as deer, elk and members of the bovine species which have a ruminal digestion. A "ruminant repellent" according to the present invention is a repellent which effectively discourages browsing by ruminants upon edible material to which the repellent has been applied. The term "browsing" as used herein means the effective removal of all or part of the leaf, twig, branch or other part of living plant matter or the biting into of other edible material. For purposes of the examples herein, a leaf is considered browsed even if it is merely nipped from a branch or from its location in one of the tests and is thereafter deposited on the ground but not wholly eaten by the animal.

The term "extraction" as used herein means intimately contacting a material containing a solute with a solvent immiscible with at a least a portion of such material. The solute goes into solution with the solvent, which is then removed by phase separation or other physical separation process from the immiscible portion of the material. The term "water immiscible, organic solvent" as used herein is a solvent composition substantially immiscible with water in all proportions, which will dissolve a major portion of the lipoidal material from mixtures of lipoidal material and other materials (such as proteinaceous material). Moreover, certain of such solvents which have a dissolution preference for certain lipids may be used to extract or elute these lipids from lipoidal materials. The term "water miscible, lipid solvent" as used herein is a solvent for lipoidal material, which when containing the lipoidal material in solution is miscible in substantially all proportions with water.

The term "carrier" is used to define a composition or mixture of materials which may be used to dilute a repellent composition to enhance the application characteristics of the repellent composition. Both water immiscible and water miscible solvents can be used as carriers. The term "formulate" is utilized herein to define the process by which the repellent composition is combined and/or suspended in a carrier. "Formulation" is used to define the resulting composition of matter. As will be seen later, the carrier may be primarily an aqueous mixture or solution or may be a nonaqueous mixture or solution. The term "contacting" is used in the context of applying the repellent composition or repellent and carrier to edible material, and is used to define the process by which the composition is deposited on the edible material or is caused to come into intimate contact with edible material.

The term "putrefied" is used to describe a material that has been subjected to the chemical reaction normally known as putrefaction, which occurs when lipoidal and/or proteinaceous material undergoes an essentially uncontrolled microbiological decomposition. The term "unputrefied" is used herein to describe a material that has not been subjected to the putrefaction process to any substantial extent, i.e., that a material capable of putrefaction has not become putrefied or decomposed to the extent that the material would be inedible by animals or to the extent that the material has produced decomposition products which are toxic to animals. The term "fresh" is used herein synonomously with unputrefied. The products of a controlled fermentation process would be unputrefied within the meaning intended herein. A lipid and a phospholipid as intended herein would be unputrefied rather than putrefied. When a lipid has become putrefied, it has decomposed into its component parts as defined above.

Description of Embodiments

Unputrefied, naturally occurring lipoidal material can be applied directly to edible material as an effective ruminant repellent. The phospholipids present in the lipoidal material form the active repellent fraction of that lipoidal material. The major components of the phospholipids are lecithin, cephalin and sphingomyelin. These phospholipids when applied separately are effective ruminant repellent compositions; however, lecithin is the most effective and thus is preferred among the phospholipid components. Effective ruminant repellents can be derived from both animal and plant lipoidal material sources. Examples of animal sources for lipoidal material are unputrefied egg, shellfish and fish. Eggs from any source can be used although chicken eggs are preferred for several reasons among which are their availability. Eggs can be used in whole, fresh form or with the yolk separated from the white. In addition, commercially available dried eggs can be utilized and, as set forth below, are a most preferred source of lipoidal material. Ruminant repellents can also be prepared from salted, fermented fish and shellfish, such as shrimp and anchovy. Phospholipoidal material from the soybean plant has also been found to be an effective repellent composition. Specifically, the lecithin extracted from the soybean has been effectively employed as a ruminant repellent composition. Both bovine cephalin and bovine lecithin can also be utilized as an effective repellent composition, although these latter materials are some of the most effective, they are rather costly to use in commercial applications.

At the present time the most preferred source of lipoidal material is from the unputrefied chicken egg. This unputrefied material is especially advantageous since it does not exhibit mammalian toxicity or phytotoxicity upon application to edible material. If desired, the lipoidal material from a natural, whole source (by natural, whole source it is meant a material containing not only lipoidal material but also proteinaceous material, minerals, and other naturally occurring biochemical matter), such as eggs, can be extracted using a suitable solvent for the lipoidal material. Extraction of the lipoidal material from a whole source will increase the concentration of the repellent composition, resulting in increased effectiveness of the repellent composition with the same quantitative application to edible material. If desired, but not necessarily commercially preferred, the lipoidal material can be further treated to elute or extract the phospholipoidal fraction from the lipoidal material to further concentrate the active repellent composition. With respect to the whole egg source, it has been found that the pigments in the lipoidal material (primarily the yolk), including lutein, zeaxanthin, and crypotoxanthin enhance to some extent the repellent activity of the phospholipids in the lipoidal material. The mechanism by which these pigments cause the increased activity is unknown; therefore, speculation on the mechanism is not proffered.

The lipid fraction from the animal material can be concentrated or removed from a source of lipoidal material by conventional physical or chemical separation processes. For example, the lipid fraction can be removed from whole, homogenized eggs utilizing solvent extraction techniques to dissolve the lipoidal material with a suitable, water immiscible, organic solvent such as a hexane, chloroform, or various ethers. A continuous, countercurrent extraction process can be employed; however, for most purposes a batch extraction operation can be used. For example, a solvent such as a chloroform/methanol mixture (2:1 by volume, respectively) can be added to whole, homogenized eggs in an amount equal to on the order of 10 to 100 parts by weight of solvent to one part by weight of whole egg. The solvent is then thoroughly mixed with the whole egg, after which phase separation is allowed to occur. Thereafter, the solvent, including its solute (the lipoidal material) can be decanted from the two phase system to separate it from the water phase. The solvent can then be removed from the lipid fraction by vacuum distillation or other suitable techniques. For example, the extracted lipid fraction from eggs which remains after vacuum evaporation of the solvent is a clear, viscous liquid having a dark yellow color.

If desired, the phospholipid fraction can be further separated from the lipid fraction to concentrate the active repellent composition for specific applications or for commercial sale. The examples below contain a procedure for a stepwise elution (or adsorption column) chromatographic separation which can be employed for phospholipid separation from lipoidal material. Further, separation of the lecithin from the phospholipid fraction can be effected to provide a repellent concentrate which can be formulated as desired. Conventional techniques for separating phospholipids from lipoidal material are set forth in *Biochemistry and Methodology of Lipids*, Johnson, A. R. and Davenport, Z. B., Wiley Interscience, a division of John Wiley and Sons, Inc., 1971, New York, New York, expressly incorporated herein by reference.

The most preferred phospholipid source is dried, powdered, whole chicken egg. It is preferred for several reasons, among which are its high phospholipid content, its cost, its availability, and its finely comminuted (powdered) form. Dried egg is readily available in a form referred to commercially as "inedible dried egg", which is unfit for human consumption, but which is employed as animal feed. Such inedible dried egg is included within the definition of unputrefied lipoidal material.

The above repellent compositions, with or without formulation with a carrier, can be directly applied to plant material. Both aqueous and nonaqueous carriers can be used. An effective method for applying the above composition to plants is by first formulating the repellent composition with an aqueous carrier and a binder. The binder is added to the carrier to increase the adherence of the repellent to the edible material after application, while the water dilutes the composition for more efficient use. When a whole source, such as whole eggs is used, an effective repellent is formulated by combining from 0.2 percent to 10 percent by weight of the repellent composition, from 0.1 percent to 15 percent by weight of the binder, and 75 percent to 99.7 percent carrier (or diluent), the percentages being based on the total mixture. An emulsifying agent can be added, if desired, to form an oil-in-water emulsion between the lipoidal material and the aqueous carrier. If an emulsifier is employed, it can be added in an amount ranging from 1 percent to 10 percent by weight, based on the amount of repellent composition present in the total mixture. A typical formulation contains on the order of 1 to 10 percent of the repellent composition (depending on whether or not the repellent composition has been concentrated from a whole source), 13.5 percent of the binder, and 76.5 to 85.5 percent by weight of water. Since the lipid fraction extracted from lipoidal material has a greater concentration of the active repellent composition, it is preferably formulated with water and a binder and emulsifier in amounts ranging from 0.2 percent to 3 percent by weight of the repellent composition and about 5 percent to about 15 percent of the binder with the remainder of the formulation being water. When the phospholipid fraction is extracted by gradient elution chromatography (as set forth below) or other suitable methods, the repellent composition can be formulated using about 0.1 percent to about 1 percent of the eluted phospholipid and about 0.1 percent to about 1.5 percent of the binder, the remainder of the formulation being water. The foregoing percentages and all other percentages given herein are by weight based on the total composition or mixture unless otherwise specifically designated.

A suitable agent which performs both as a binder and emulsifier is sold under the name "UCAR-180". "UCAR-180" is a tradename of the Union Carbide Company and is an acrylicvinylacetate, nonionic, emulsion co-polymer. Other suitable binders are "Rhoplex AC 33" a tradename of the Rohm and Haas Company, Philadelphia, Pennsylvania for its aqueous dispersions of acrylic co-polymers; "Acryloid F-10", a tradename of the Rohm and Haas Company for its acrylic ester polymers in a mineral spirits solvent. ("Acryloid F-10" contains about 40 percent by weight of solid polymer); and Carb-O-Set, an acrylic co-polymer containing a precise ratio of polar carboxyl groups and nonpolar groups, available from B.F. Goodrich Chemical Company, Cleveland, Ohio (Carb-O-Set 514H is an aqueous emulsion and Carb-O-Set 514A is a solution of the co-polymer in a solvent such as isopropanol). Suitable binders and emulsifiers should not be phytotoxic, should set up relatively rapidly to aid the active ingredient in readily adhering to the plant, and should be relatively versatile with respect to the ambient conditions under which it can be applied.

Although aqueous carriers are used with great effectiveness for the repellent composition of the present invention, an initial preformulation can be made by combining a source of lipoidal material with a water miscible solvent for the lipoidal material to form a repellent concentrate. In addition, a binder can be added for the same purposes as in the aqueous formulation above, i.e., to provide better adherence of the repellent composition to the edible material after application. This concentrate contains all the requisite active ingredients and contains all the components necessary to provide a commercially usable and effective ruminant repellent. This concentrate can then be further diluted with the same water miscible solvent and applied directly to edible material. If desired, the repellent concentrate can also be effectively and economically diluted with water for application to edible material. In addition, the dissolved lipoidal material and water miscible solvent can be mixed with various other repellents, such as a rabbit repellent. A typical rabbit repellent is tetramethylthiuram disulfide (hereinafter TMTD), commercially available from E.I. du Pont de Nemours and Company under the tradename "Arasan" and from Pennwalt Corporation, Philadelphia, Pennsylvania, under the tradename "Thiram". When the concentrate is combined with binders which are only partially miscible with water and when the concentrate is to be further diluted with water, it may be desirable or necessary, depending upon the nature of the binder system being utilized, to add a solubilizing agent such as ammonium hydroxide to form a completely solubilized system.

Although preformulation with a water miscible solvent provides a more versatile repellent concentrate, any suitable solvent for lipoidal material can be employed to form the concentrate. If a water immiscible solvent is chosen, then dilution of the concentrate must be accomplished with the same solvent or a solvent which is miscible with the initially chosen water immiscible solvent. A suitable water immiscible solvent is "Chevron 250", a tradename of the Chevron Chemical Company, San Francisco, California for its organic solvent comprising about 94 percent by weight of paraffins and napthenes and about 6 percent by weight of toluene.

Water miscible, lipid-dissolving solvents which can be utilized to form a repellent concentrate are abundant. Preferred water miscible solvents are the alkyl alcohols having from one to four carbon atoms. Other solvents which can be utilized and which exhibit the same low toxicity characteristics are exemplified by diacetone alcohol, dichloroethyl ether, dioxane, cellosolve (a tradename of the Union Carbide Company for its ethylene glycol monothylether solvent), methyl ethyl ketone, and isopropyl acetate. Other effective but less preferred solvents, which may exhibit greater phytotoxicity or mammilian toxicity than the foregoing, are disclosed in an article by Gast, R., and Early, J., *Agricultural Chemicals*, 10, April, 42(1956), pp 42, 43, 136 137 and 139, expressly incorporated herein by reference. All of the solvents listed in the foregoing article which are water miscible will form an effective solvent for the repellent composition of the present invention. However, as can be seen from the data provided in the referenced pages, several of the solvents have a relatively high phytotoxicity, and thus are not desirable from that standpoint. Characteristics of the solvent which are desirable for a commercial, sprayable repellent composition include ready biodegradability without leaving toxic residue, water solubility for most applications, and, the capability to solubilize the phospholipids in the source material. If a nonaqueous formulation is desired certain of the listed solvents which are not desirable from the water miscibility standpoint, such as ethylacetate and ethylene dichloride, can be employed.

The alcohols, especially those containing from one to four carbon atoms are preferred because of their very low phytotoxicity and mammilian toxicity. In addition, the alcohol denatures the protein present in the powdered egg thus allowing it to go into a colloidal suspension in an aqueous carrier system. Further, the alcohol is completely miscible in all proportions with an aqueous carrier. And importantly, the alcohol dissolves the phospholipids in the source material and extracts them from the remaining inactive materials in the powdered egg source. When powdered egg is preformulated as a concentrate utilizing a solvent such as alcohol, the resulting concentrate exhibits better repellency than when powdered egg is solubilized with an aqueous carrier alone. This result is believed to be caused because the phospholipids from the egg are dissolved in the alcohol. Due to the complete miscibility of the alcohol in water the phospholipids dissolved in the alcohol are in solution with the diluent for the final formulation (whether it be additional solvent or water), resulting in very even distribution of the phospholipids throughout the carrier. The phospholipids can thereby be easily, evenly and completely distributed over all the edible material from which it is desired to repel ruminants.

The foregoing repellent concentrates and final repellent formulations meet all the desirable characteristics of a ruminant repellent a set forth above. Dried eggs are stable for about six months without refrigeration in their commercially available form. They can be stored for significant periods of time without special storage conditions or preservation requirements. The dried eggs are also shippable without special handling requirements. The concentrate, including dried eggs and isopropyl alcohol or one of the other suitable solvents, is stable for at least six months and is also shippable and storable without special requirements, except for the flammable nature of the solvent. Furthermore, the repellent concentrate is easily dilutable with additional solvent or with water to provide a commercial formulation which can be sprayed on or otherwise applied to edible material without the use of special equipment and without special handling procedures.

When whole fresh egg or other biodegradable material is utilized as a source of phospholipids, preservatives can be added, if desired, prior to, during, or after formulation to yield a repellent composition or formulation which is relatively stable in storage and which tends not to produce toxic degradation products after application to edible material. Certain inorganic salts constitute excellent preservatives. The salts will stabilize the fresh lipoidal materials to the extent that putrefaction will not take place. Some fermentation may occur, however, the products of fermentation do not adversely affect repellency and do not exhibit harmful levels of phytotoxicity and mammilian toxicity. For example, the salted fish and shrimp bioassayed in the examples below are fit for human consumption. Inorganic salts, such as sodium chloride, potassium sulfate, magnesium sulfate, ammonium phosphate of mixtures thereof, can be added in amounts up to 20% by weight, based on the amount of lipoidal source material present, without changing the effectiveness of the repellent composition. Some of these salts are presently used as fertilizers. Thus, additional benefit is incidentally derived from the use of the salts in the repellent composition. Other effectively employed preservatives are formaldehyde, benzoic acid and sodium propionate.

The various concentrates and formulations of the repellent compositions are prepared primarily according to the conditions under which the formulation will be applied. For most applications in the forestry industry, an aqueous formulation can be used. However, when wet weather is encountered a nonaqueous formulation is preferred since it will not be as easily washed from the trees to which it is applied as will an aqueous formulation. A typical, and presently preferred, repellent concentrate for application to seedlings situated in a tree nursery comprises 6 parts by weight of powdered, inedible, dried chicken egg (the source of phospholipids), 12.6 parts by weight of an aqueous suspension of TMTD (about 40% by weight TMTD and about 60% by weight water), 0.006 parts by weight of a 37% aqueous solution of formaldehyde (a preservative), and 31.4 parts by weight of "Rhoplex AC 33" (a binder, identified above). The foregoing concentrate is diluted at the rate of 3 parts by volume of water to 1 part by volume of the concentrate to provide a suitable formulation for application by spraying. The same concentrate and sprayable formulations can be applied to tree plantations. If desired the TMTD can be omitted, and "UCAR-180" binder can be substituted for the "Rhoplex" binder. For spray application to plantation trees in wet weather, a nonaqueous formulation is preferred. A typical nonaqueous formulation is prepared by combining 3 parts by weight of powdered, inedible, dried egg (chicken), 10 parts by weight of "Acryloid F-10"

(a binder, identified above) and 87 parts by weight of Chevron 250 (a solvent, defined above). TMTD can be added to this wet weather concentrate as a rabbit repellent if desired. For aerial spraying of trees in a plantation of different binder is presently preferred. A typical formulation for aerial application includes 3 parts by weight of powdered, inedible, dried egg, 7.5 parts by weight of "Carb-O-Set 514H," and 89.5 parts by weight of water.

Another suitable repellent concentrate using an alcohol carrier comprises 12 parts by weight of dried, powdered, inedible egg, 45.2 parts by weight of isopropyl alcohol (the solvent or carrier), 12 parts by weight of Carb-O-Set 514A (the binder), and 0.8 parts by weight of concentrated ammonium hydroxide (an aqueous solubilizing agent). In the latter formulation the ammonium hydroxide is required only when it is desired to further dilute the foregoing repellent concentrate with water. The solubilizing agent is not necessary for a nonaqueous system, for example, where the concentrate is further diluted with isopropyl alcohol. Since the Carb-O-Set binder is not completely soluble in an aqueous system, the solubilizing agent is required to provide a completely solubilized aqueous formulation. The foregoing concentrate can be diluted by additional solvent or by water, either of which are effective carriers for the repellent composition. For application to edible material, especially during wet rainy weather, it is preferred that the concentrate be diluted with an alcohol, such as isopropyl alcohol, in the ratio of one part by volume of the concentrate to three parts by volume of isopropyl alcohol. For application to edible material by hand or for aerial spraying, especially during dry weather, it is preferred that the formulation concentrate be further diluted with water in the ratio of one part by volume of the concentrate to three parts by volume of water. The alcohol, and specifically isopropyl alcohol, is preferred during rainy weather since it will volatize faster, thereby tending to dry faster and allowing the binder to better adhere the active repellent components to the edible material.

The repellent formulations (both the aqueous and nonaqueous formulations thereof described above) can be applied to two and three year old Douglas fir seedlings, by conventional mechanical spraying apparatus. These formulations provide effective repellent properties when applied at the rate of 100 gallons of repellent formulation per 300,000 two year old seedlings and 100 gallons per 100,000 three year old seedlings. As another example, where seedlings are planted at a density of on the order of 600–700 trees per acre, 1 to 2 gallons per acre applied by hand-held sprayers can be utilized to effectively prevent browsing of new growth on such trees by ruminants. The same formulation has also been found effective when sprayed in concentrations of about 10 gallons per acre from a helicopter. The foregoing application levels of the repellent compositions and formulations are intended to be representative of effective levels of repellency. One of ordinary skill after reading the foregoing specification will be able to adjust these effective application levels depending on the type of crop, the weather conditions, terrain, ruminant population, and other variables known to him.

The repellent compositions (both the aqueous and nonaqueous formulations thereof described above) are also effective to discourage ruminants from browsing edible material even if not directly applied to the edible material. Ruminants are repelled from an area or region, to which they would otherwise normally be attracted because of the presence of edible material, if the ruminants encounter the presence of the repellent composition at the periphery of the area, since they will refrain from crossing the periphery into the area or region. This holds true whether the area is relatively large, as a tree nursery or plantation, or small, as an area of several square feet containing a single 4 year old tree.

The repellent composition, formulated as described above, can be applied to the periphery of the area in several ways. The foliage and/or the land along the peripheral portion of the area can be sprayed in a 2 or 3 foot wide or wider strip, which strip surrounds the area from which it is desired to repel ruminants. Alternatively, a "chemical fence" can be prepared to repel ruminants from a chosen area. To prepare such a fence the repellent composition is sprayed onto, spread onto, or absorbed in a piece of material, such as a length of fiber rope, which in and of itself has no repellent effect, i.e., is relatively inert. The rope or other material is then placed along the peripheral portion of the area from which it is desired to repel ruminants. As ruminants encounter the strip surrounding the area, or the rope placed around the area, they are repelled, preventing them from gaining access to the area, and thus, discouraging them from browsing any edible material which may be present in the area. Although any suitable type of material can be used as the substrate for the chemical fence, it is preferred that the material be of a nature which will retain effective amounts of the repellent composition. Thus, a natural fiber rope having good absorbent properties is desirable. The rope can be treated with the repellent composition by submersing it and soaking it for a few hours in one of the foregoing repellent formulations. Thereafter, it can be strung along posts surrounding the area from which it is desired to repel ruminants.

In a like manner, the repellent formulations of the present invention can be used to divert ruminants from normal migration or range paths to guide them away from areas through which they might otherwise normally travel on a day-to-day or on a seasonal basis. For example, a strip several feet wide along a well traveled ruminant migration path can be sprayed with the repellent composition. The path of the sprayed strip can be located to cross over the normal migration path and lead into an area away from the region from which it is desired to repel the ruminants. As the ruminants travel their normal migration paths and encounter the strip sprayed with the repellent formulation, they will refrain from crossing the strip and will instead be diverted along the side of the sprayed strip in a direction away from the region from which it is desired to repel them.

Bioassay Procedure

A herd of about 30 blacktail deer is penned in a 6 acre tract which is subdivided into a northern half and a southern half by an open-ended fence. The deer have free access to all 6 acres. About three-fourths of the pen has a cover of grasses and broad-leafed forbes and about one-quarter of the pen has trees, mostly Douglas fir, some maple, hazelnut, cedar, and true fir. The deer have constant access to harvested alfalfa hay, a specially formulated pelletized feed (containing salt), and running water.

The substrate of edible material used for the tests are branches of salal (Gaultheria shallon) which is readily browsed by wild deer during the six winter months from mid-October to mid-March, inclusive. The salal is prepared so that each branch bears 10 leaves and is labeled with a small piece of plastic tape bearing an identification number. The branches are treated with a repellent composition by spreading about 0.0125 grams of a repellent formulation, including repellent composition, binder, and water, on the upper side of each leaf and the same amount on the underside of the leaf.

Wooden 2 inch by 2 inch stakes are driven into the ground in rows in selected areas in the deer pen. The rows each contain about 13 stakes at 3 foot intervals with a second parallel row at a distance of 8 feet from the first row. This arrangement is replicated in both halves of the pen. Salal branches are attached to each of the stakes in sets of two, each set containing a pair of marked salal branches. One of each pair of the branches is untreated and serves as a control while the other branch of each of the pairs is a treated sample.

After all the branches have been attached to the stakes, the deer are given free access to the stakes and are allowed to browse the salal leaves at will. The amount of browsing is calculated in terms of percent of salal leaves browsed. For purposes of this bioassay a leaf is considered to be browsed if it is either partially or totally eaten by the deer. For each particular repellent composition tested, the percentage of treated leaves browsed on each branch is calculated. The percentage is then averaged throughout the entire number of leaves contacted with that composition. For example, if two of the 10 treated leaves on a given branch are partially or wholly eaten by the deer, the branch is considered to be 20% browsed. Normally not all of the stakes contain samples treated with the same formulation containing the same composition. In a typical test 40 to 80 leaves are treated with the same composition and averaged to provide a percentage browsed for the treated branches and a percentage browsed for the control branches. Browse counts are taken at various intervals depending on the browsing pressure and the life expectancy of the repellent compositions under test.

Examples

The following examples are intended to teach one of ordinary skill in the art how to make and use the invention disclosed herein. They are not intended to limit the invention in any manner, but are intended only to be illustrative thereof. All percentages used in these examples are weight percent, unless otherwise specifically noted.

EXAMPLE I

Whole fresh chicken eggs are removed from the shell and homogenized. The eggs are combined with "UCAR-180", a binder defined above, and an amount of water sufficient to make the total formulation of eggs, binder and water weigh about 250 grams. The percentage of whole fresh egg, of binder and of water are listed in Table I below. This formulation, identified Ia, is then applied to salal leaves in accordance with the bioassay procedure described above. Browse readings are taken at the time intervals indicated below in Table I. The formulation identified Ia provides an effective deer repellent.

A second formulation identified Ib, is prepared in a manner similar to that of formulation Ia except that one-tenth of one percent salt (sodium chloride), based on the total formulation, is added. The salt used is Morton brand, non-iodized table salt (sodium chloride). The sodium chloride is added as a liquifying agent and as a preservative for the egg. The formulation identified Ib is then bioassayed. The results are set forth in Table I below.

A third formulation, identified Ic, similar to that of Formulation Ib is prepared. This formulation contains three-tenths of one percent salt based on the total formulation.

A fourth formulation, identified Id, similar to formulation Ib is prepared. Formulation Id contains six-tenths of one percent salt based on the egg and salt present in the formulation.

A fifth formulation, identified as Ie, similar to formulation Ib is prepared. This formulation contains one percent salt based on the total egg and salt present in the formulation. The results of the bioassay of formulation Ie is set forth in Table I below.

EXAMPLE II

Another formulation, identified IIa is prepared by first mixing 8.5 grams of whole egg, which has been shelled and homogenized, with 1.5 grams of sodium chloride and immediately thereafter mixing the egg and salt with 16.7 grams of UCAR-180 as a binder and 73.3 grams of tap water. This formulation is immediately bioassayed without letting it stand for any substantial length of time. The results of the bioassay of formulation IIa are set forth below in Table II.

A second formulation, identified IIb is prepared in a manner substantially the same as that of formulation IIa, except that the egg and sodium chloride mixture is allowed to stand at room temperature for 3 days before it is formulated with the binder and water. After the 3-day standing period, the egg was not putrefied. The egg is then formulated with the binder and water and is immediately bioassayed. The results of the bioassay of formulation IIb are set forth in Table II below.

A third formulation, identified IIc, is prepared in substantially the same manner as formulation IIa, except that the egg and sodium chloride mixture is allowed to stand at room temperature for a period of 6 days before the formulation with the binder and water. After the 6-day period, the egg was not putrefied. The egg/salt mixture is then formulated with the binder and water and is immediately bioassayed. The results of the bioassay for this formulation are set forth in Table II below.

EXAMPLE III

Another repellent composition, identified as III, comprises a commercially available salted shrimp containing 80% moisture and about 20% solids. The solids are approximately 85% ground shrimp and 15% salt (sodium chloride). The commercial brand of shrimp utilized is available from Lee Kum Kee, of 262 Queen's Road, Hong Kong, Crown Colony of Great Britian. The repellent composition is formulated by combining 4% of the salted shrimp with 13.5% of UCAR-180 and 82.5% water and is immediately bioassayed. The results of the bioassay of formulation III are set forth in Table III below.

EXAMPLE IV

Another repellent composition, identified IV, is commercially available ground salted anchovy and is estimated to contain between 10 and 20% by weight of salt (sodium chloride) based on the total solids present in the material. The ground anchovy utilized is available from Balayan, Bagoong; Daang Hari, Novotas, Rizal; Phillipines. Four percent of the ground anchovy is admixed with 13.5% of UCAR-180 binder and 82.5% of water. Thereafter the formulation is immediately bioassayed. The results of the bioassay are set forth below in Table III.

EXAMPLE V

Approximately 120 grams of whole egg, which has been separated from the shells and homogenized, is combined with 120 milliliters of a solvent comprising a 2 to 1 volume ratio of chloroform and methanol, respectively. The solvent is thoroughly admixed with the whole egg. The mixture is then filtered through a Whatman No. 1 filter paper. This extraction procedure is then repeated three times with the solid left on the filter paper, each time using an additional 120 milliliters of solvent. Thereafter the four 120 milliliter batches of solvent are combined and placed in a vacuum chamber and a vacuum is drawn thereon to evaporate all of the solvent. The material remaining in the evaporating chamber is an oily, viscous liquid comprising the lipoidal material from the whole egg. Three percent of this lipoidal material is then formulated with 97% by weight of a nonaqueous carrier, comprising 85% hexane and 15% mineral oil, to form the repellent formulation designated Va.

This procedure is repeated to prepare a second repellent formulation designated Vb, except that prior to the extraction step, the 120 grams of whole egg is first combined with 18 grams of salt (sodium chloride) and then homogenized. The chloroform/methanol solvent is then used to extract the lipoidal material from the egg/salt mixture in the manner described above. Three percent of the extracted material is then combined with nonaqueous carrier in the manner described above.

A third repellent formulation is prepared by physically separating the egg white from 120 grams of shelled eggs. The egg white is then combined with 15% salt (sodium chloride) based on the egg white/salt mixture. The egg white/salt mixture is then formulated to provide a formulation containing 3% egg white/salt mixture, 13.5% UCAR-180 and 83.5% water. This formulation is designated Vc.

The repellent compositions are bioassayed immediately after formulation. The results of the bioassay of the formulations designated Va, Vb, and Vc are set forth in Table IV. The bioassay results of repellent compositions Va, Vb, and Vc are contemporaneously compared with a formulation having the composition of repellent composition designated IIa. (It should be noted that the results set forth in Table II cannot be directly compared with the results set forth in Table IV as the bioassays of Table II were carried out at a different time than the bioassays of Table IV. It must be understood that bioassay conditions can vary from week to week and even from day to day because of climatic and seasonal changes, as well as changes in the feed supplements fed to the deer, all of which will significantly affect the browsing pressure applied by the deer and the preferences of the deer for one type of feed over another.)

EXAMPLE VI

By following the procedure of this example a repellent composition is prepared from the phospholipid fraction of whole eggs. The lipid fraction is extracted from whole eggs by following the procedure outlined with respect to the composition designated Va above. The viscous lipoidal material is removed from the vacuum chamber and is run through a preparatory column chromatograph. The column is packed with "Silic-AR", a tradename of the Mallinkrodt Chemical Company, St. Louis, Missouri for its silica gel chromatography media. The column has a diameter of approximately 5 centimeters. About 5 grams of the extracted lipid fraction are placed on the top of the column. Solvent is then added to the column at a flow rate of approximately 1.5 to 2 milliliters per minute. The column is run at ambient temperatures of about 25°C. Initially the solvent is a mixture of approximately 99% hexane and 1% diethyl ether. Over a period of approximately 6 hours the concentration of the solvent is changed linearly to about 1% hexane and 99% diethyl ether. Over the 6 hour period, 4 samples of substantially equal volume are sequentially collected from the bottom of the column. These four fractions contain substantially all of the neutral lipids in the lipid extract from the eggs. Thereafter the solvent system is changed to chloroform ($CHCl_3$) and methanol. This solvent is run through the column, at a flow rate of 1.5 to 2 milliliters per minute. Initially the solvent concentration is about 99% chloroform and 1% methanol. Over a second 6 hour running period the concentration of the solvent is changed on a linear basis to approximately 99% methanol and 1% chloroform. The system is finally flushed for a period of about 30 minutes with 100% methanol. During the second 6 hour period three samples of substantially equal volume are sequentially taken from the bottom of the column. These last three samples contain substantially all of the phospholipids contained in the original lipid fraction from the eggs. By comparison with conventional column chromatographs by the standard procedure outlined at pages 151 to 170, *Biochemistry and Methodology of Lipids*, supra, incorporated herein by reference, it is confirmed that the chloroform-methanol fractions contained in the phospholipids. The 4 fractions obtained from the hexane-diethyl ether elution are serially identified as VIa, VIb, VIc, and VId respectively, while the three fractions taken from the chloroform-methanol elution are serially identified as VIe, VIf, and VIg in the sequence from which the samples were taken from the column.

The samples VIa through VIg are then formulated by combining a portion of each of the samples (ranging from 1.2 to 0.3 parts as set forth in Table V) with 13.5 parts by weight, UCAR-180, 1.0 part by weight of Cab-O-Sil filler (a trademark of Cabot Corporation, 125 Wigh Street, Boston, Massachusetts, for its colloidal, pyrogenic silica) and 85.5 parts by weight deionized water. The amount of the samples VIa through VIg combined with the binder, filler and water is set forth in Table V below. The control, designated $C_{VI\ aq.}$ consists of 16.5% UCAR-180 and 83.5% water. These formulations are then bioassayed. The results of the bioassays are also set forth in Table V.

EXAMPLE VII 1.2 parts by weight of commercially available egg lecithin is formulated by mixing with 100 parts by weight of a solvent containing 85% hexane and 15% mineral oil and is designated formulation VIIa. The egg lecithin is available from ICN Nutritional Biochemical's Corporation, Cleveland, Ohio 44128, as listed in their *Research Biochemical Catalog*, Fall 1973 edition. The formulation is bioassayed along with the control designated $C_{VI\ aq.}$. The bioassay results are set forth in Table V below.

1.2 parts by weight of a second sample of the commercially available egg lecithin is combined and is then formulated with 13.5 parts of UCAR-180, 1 part by weight of Cab-O-Sil (identified above) and 85.5 parts by weight of deionized water. This formulation, designated VIIb, is then bioassayed. The results are set forth in Table V below.

1.2 parts by weight of commercially available bovine lecithin (90% pure bovine), available through the *Research Biochemical's Catalog* (identified above), is formulated with 100 parts by weight of the nonaqueous solvent containing 85% hexane and 15% mineral oil. This formulation, designated VIIc is then bioassayed. The results of the bioassay are set forth below in Table V.

A second sample of one point two (1.2) parts by weight of the bovine lecithin is formulated with 13.5 parts by weight UCAR-180, 1 part by weight Cab-O-Sil, and 85.5 parts by weight of deionized water. This formulation, designated VIId, is then bioassayed. The results of the bioassay are set forth in Table V below. In addition another control, designated $C_{VII\ nonaq.}$, comprising 85% by weight hexane and 15% by weight mineral oil is bioassayed with the results also set forth in Table V.

It will be noted that the commercial egg and bovine lecithin combined with UCAR-180 resulted in limited browsing during the bioassay. This variation in the browsing compared with the repellent in the nonaqueous carrier can be attributed to the incomplete solubilization of the commercial lecithin in the aqueous UCAR-180 formulation, resulting in non-uniform distribution of the lecithin throughout the formulation. Therefore the repellent composition is not uniformly distributed over all the salal leaves during the bioassay, resulting in browsing of certain treated leaves whereas others of the treated leaves are not browsed at all.

For purposes of a direct comparison, extracted egg yolk lipid, obtained as described in Example V above, is formulated by mixing 1.2 parts of the extracted lipid with 13.5 parts of UCAR-180, 85.5 parts of deionized water and 1.1 part by weight of Cab-O-Sil. This formulation, designated VIIe, is then bioassayed. A second sample of 1.2 parts by weight of the extracted egg yolk lipid is formulated with 100 parts by weight of the nonaqueous solvent (85% hexane and 15% mineral oil). This formulation, designated VIIf is then bioassayed. The results of the bioassays of the formulations VIIe and VIIf are set forth in Table V.

EXAMPLE VIII

A sample of commercially available bovine cephalin (available through the *Research Biochemicals Catalog* identified above), is formulated by mixing 0.9 parts by weight of the cephalin with 99.1 parts by weight of an aqueous carrier mixture containing 13.5 parts by weight UCAR-180, 1 part by weight Cab-O-Sil and 85.5 parts by weight of deionized water. This formulation, designated VIIIa is then bioassayed. The results are set forth below in Table VI. A second sample is formulated by mixing 0.9 parts by weight of shelled, whole egg and 99.1 parts by weight of the UCAR-180/Cab-O-Sil/water carrier mixture. This formulation, designated VIIIb is then bioassayed. The bioassay results are set forth below in Table VI.

For comparison 0.9 parts by weight of bovine lecithin, (identical to that described in Example VII above) is formulated with 99.1 parts by weight of the UCAR-180/Cab-O-Sil/water carrier mixture. This formulation, designated VIIIc is then bioassayed. A fourth formulation, designated VIIId, is prepared by combining 0.9 parts by weight of the lipids extracted from egg yolk (as described in Example V above) with 99.1 parts by weight of the UCAR-180/Cab-O-Sil/water carrier mixture. This formulation is then bioassayed. The results of the bioassay of samples VIIIc and VIIId are set forth in Table VI.

The increased browsing shown by the results of the bioassay in Table VI can be attributed to variations in seasonal and day-to-day browsing pressure by the deer used in the bioassays.

EXAMPLE IX

A sample of commercially available soy lecithin (available from the *Research Biochemicals Catalog*, identified above) is formulated by combining 0.3 grams of the soy lecithin with 13.5 grams of UCAR-180 and 86.2 grams of water. The formulation, designated IXa, is then bioassayed. This formulation is contemporaneously bioassayed with a control formulation, designated $C_{IX\ aq.}$, comprising UCAR-180. The bioassay results are set forth in Table VII after the numeral 1. The results indicate that soy lecithin does exhibit repellent activity. A second bioassay is conducted with formulations identical to sample IX and control $C_{IX\ aq.}$ at a different time. The results are set forth in Table VII after the numeral 2. The results are substantially the same as those previously conducted.

EXAMPLE X

Dried egg is formulated and bioassayed to determine its effectiveness as a ruminant repellent. A first sample of commercially available, dried, whole chicken egg is formulated by combining 2.5 parts by weight of dried egg, 2.5 parts by weight of isopropanol, 13.5 parts by weight of UCAR-180, and 81.5 parts by weight of water. This formulation is designated Xa.

A second sample of the dried egg is formulated by combining 2.5 parts by weight of the dried egg, 13.5 parts by weight of UCAR-180 and 84.0 parts by weight of water. This formulation is designated Xb.

A third sample of commercially available dried egg is formulated by combining 2.5 parts by weight of dried egg, 2.5 parts by weight of isopropanol, 13.5 parts by weight of UCAR-180 and 81.5 parts by weight of water. This formulation is designated Xc and is identical to Xa as explained below.

A fourth sample of dried egg is formulated by combining 2.5 parts by weight of dried egg, 7.4 parts by weight of Carb-O-Set 514H, (identified above) and 90.1 parts by weight of water. This formulation is designated Xd.

A fifth sample of dried egg is formulated by combining 2.5 parts by weight of dried egg, 7.4 parts by weight of Carb-O-Set 514H and 90.1 parts by weight of isopropanol. This formulation is designated Xe. The formulations Xa, Xb, Xc, Xd, and Xe are bioassayed and compared with a control designated $C_X$, which comprises UCAR-180. The results of the bioassay are set forth below in Table VIII. The variation in the results between the identical formulations, Xa and Xc, can be attributed primarily to the fact that formulation Xa was bioassayed at a time different from formulations Xb, Xc, Xd, Xe and the control, the latter set of which was bioassayed at the same time.

TABLE I

BIOASSAY RESULTS OF FORMULATIONS

| Formulation Identification (Example No.) | Repellent Fraction (Wt. %) | Salt (Wt.%) | Binder (UCAR-180) (Wt.%) | Water (Wt. %) | Treated (T) Control (C) | Percent (%) Browsed (See Bioassay Procedure above) | | | | |
|---|---|---|---|---|---|---|---|---|---|---|
| | | | | | | 2 Hrs. | 6 Hrs. | 17 Hrs. | 26 Hrs. | 41 Hrs. |
| I a (whole egg) | 10 | 0 | 13.4 | 76.6 | T | 0 | 0 | 0 | 12 | 48 |
| | | | | | C | 19 | 58 | 75 | 75 | 94 |
| I b (whole egg) | 9.9 | 0.1 | 13.4 | 76.6 | T | 0 | 0 | 0 | 5 | 39 |
| | | | | | C | 14 | 44 | 70 | 76 | 88 |
| I c (whole egg) | 9.7 | 0.3 | 13.4 | 76.6 | T | 0 | 0 | 0 | 24 | 50 |
| | | | | | C | 21 | 63 | 76 | 80 | 100 |
| I d (whole egg) | 9.4 | 0.6 | 13.4 | 76.6 | T | 0 | 0 | 0 | 11 | 44 |
| | | | | | C | 15 | 48 | 73 | 81 | 93 |
| I e (whole egg) | 9.0 | 1.0 | 13.4 | 76.6 | T | 0 | 0 | 0 | 16 | 50 |
| | | | | | C | 20 | 59 | 75 | 89 | 80 |

TABLE II

BIOASSAY RESULTS EXAMPLE II

| Formulation Identification (Example No.) | | (Percent (%) Browsed (See Bioassay Procedure above) | | | | | | |
|---|---|---|---|---|---|---|---|---|
| | | 10 Hrs. | 20 Hrs. | 30 Hrs. | 44 Hrs. | 56 Hrs. | 92 Hrs. | 135 Hrs. |
| IIa | Treated | 0 | 0 | 10 | 10 | 20 | 20 | 20 |
| | Control | 40 | 100 | 100 | 100 | 100 | 100 | 100 |
| IIb | Treated | 0 | 0 | 11 | 11 | 21 | 21 | 21 |
| | Control | 35 | 40 | 100 | 100 | 100 | 100 | 100 |
| IIc | Treated | 0 | 0 | 10 | 17 | 20 | 20 | 20 |
| | Control | 40 | 100 | 100 | 100 | 100 | 100 | 100 |

TABLE III

BIOASSAY RESULTS EXAMPLES III and IV

| Formulation Identification (Example No.) | | Percent (%) Browsed (See Bioassay Procedure above) | | | |
|---|---|---|---|---|---|
| | | 24 Hours | 48 Hours | 72 Hours | 96 Hours |
| III | Treated | 10 | 10 | 20 | 20 |
| | Control | 40 | 100 | 100 | 100 |
| IV | Treated | 0 | 0 | 0 | 0 |
| | Control | 30 | 90 | 100 | 100 |

TABLE IV

BIOASSAY RESULTS EXAMPLE V

| Formulation Identification (Example No.) | Percent (%) Browsed (See Bioassay Procedure above) | | |
|---|---|---|---|
| | 26 Hours | 74 Hours | 115 Hours |
| V a | 2.5 | 2.5 | 2.5 |
| V b | 0 | 0 | 2.5 |
| V c | 0 | 100 | 100 |
| IIa | 0 | 0 | 100 |

TABLE V

BIOASSAY RESULTS EXAMPLES VI and VII

| Formulation Identification | Amount of Sample in Formulation (parts by wt.) | Percent (%) Browsed (See Bioassay Procedure above) | | |
|---|---|---|---|---|
| | | 27 Hours | 39 Hours | 77 Hours |
| VI a | 1.2 | 0 | 25 | 33 |
| VI b | 1.2 | 0 | 0 | 18 |
| VI c | 1.2 | 0 | 28 | 28 |
| VI d | 1.2 | 13 | 13 | 13 |
| VI e | 1.0 | 0 | 0 | 0 |
| VI f | 0.3 | 0 | 0 | 0 |
| VI g | 0.3 | 0 | 2.5 | 2.5 |
| $^c$VI aq. | — | 0 | 0 | 50 |
| VII a | 1.2 | 0 | 0 | 0 |
| VII b | 1.2 | 0 | 0 | 43 |
| VII c | 1.2 | 0 | 0 | 0 |
| VII d | 1.2 | 0 | 25 | 25 |
| $^c$VII non-aq. | — | 45 | 95 | 95 |
| VII e | 1.2 | 0 | 0 | 0 |
| VII f | 1.2 | 0 | 0 | 0 |

TABLE VI

BIOASSAY RESULTS EXAMPLE VIII

| Formulation Identification (Example No.) | Percent (%) Browsed (See Bioassay Procedure above) | | |
|---|---|---|---|
| | 42 Hours | 80 Hours | 114 Hours |
| VIII a | 50 | 63 | 88 |
| VIII b | 10 | 50 | 50 |
| VIII c | 7.5 | 33 | 53 |

TABLE VI-continued

BIOASSAY RESULTS EXAMPLE VIII

| Formulation Identification (Example No.) | Percent (%) Browsed (See Bioassay Procedure above) | | |
|---|---|---|---|
| | 42 Hours | 80 Hours | 114 Hours |
| VIII d | 0 | 50 | 53 |

TABLE VII

BIOASSAY RESULTS OF FORMULATIONS EXAMPLE IX

| | Formulation Identification | Percent (%) Browsed (See Bioassay Procedure Above) | |
|---|---|---|---|
| | | 4 hours | 15 hours |
| 1. | IXa | 33 | 83 |
| | $^{c}$IX aq. | 91 | 100 |
| 2. | IXa | 65 | 90 |
| | $^{c}$IX aq. | 88 | 100 |

TABLE VIII

BIOASSAY RESULTS OF FORMULATIONS EXAMPLE X

| Formulation Identification | Percent (%) Browsed (See Bioassay Procedure Above) |
|---|---|
| | After 24 hours |
| Xa | 16.3 |
| Xb | 1.3 |
| Xc | 0 |
| Xd | 0 |
| Xe | 2.5 |
| $C_x$ | 100 |

The foregoing invention has been described in terms of several embodiments, including a preferred commercial embodiment. One of ordinary skill in the art will be able to effect various changes to and substitutions of equivalents in the invention without departing from the basic concepts and discoveries outlined above. Although proportions have been set forth which are preferred for specific formulations, these proportions are not intended to be limiting in any way to the invention described. Applicant has provided those of ordinary skill in the art with proportions which are effective to repel ruminants under controlled conditions where the browsing pressure is very heavy and under field conditions where browsing pressure is light compared to the controlled bioassays. One of ordinary skill in the art will readily be able to determine what constitutes an effective amount of the repellent composition which, when added to a carrier and when applied in the field, will be adequate to repel ruminants under various weather conditions, browsing pressures, and ruminant populations. Therefore, the present invention is intended to be limited only by the definition contained in the appended claims.

What is claimed is:

1. A method for discouraging ruminants from browsing material eaten by ruminants comprising:
    contacting at least the region adjacent said material with an amount of a repellent composition effective to discourage browsing of said material by ruminants, said repellent composition containing a phospholipid as an active repellent ingredient.

2. The method of claim 1 wherein said phospholipid is derived from an animal source.

3. The method of claim 2 wherein said repellent composition comprises unputrefied egg.

4. The method of claim 3 wherein said repellent composition further comprises up to about 20 percent by weight of an inorganic salt, based on the combined weight of egg and salt, said salt being selected from sodium chloride, ammonium sulfate, potassium sulfate, magnesium sulfate, ammonium phosphate, and mixtures thereof.

5. The method of claim 3 wherein said repellent composition comprises the yolk of unputrefied egg.

6. The method of claim 3 wherein said repellent composition comprises the lipid fraction derived from unputrefied egg.

7. The method of claim 6 wherein said repellent composition comprises the phospholipid fraction derived from unputrefied egg.

8. The method of claim 7, said repellent composition further comprising pigments from unputrefied egg.

9. The method of claim 8 wherein said pigments are lutein.

10. The method of claim 2 wherein said phospholipid comprises bovine cephalin.

11. The method of claim 2 wherein said phospholipid comprises bovine lecithin.

12. The method of claim 2 wherein said animal source is selected from fish, shellfish and combinations thereof.

13. The method of claim 12 wherein said fish comprises salted, fermented anchovy.

14. The method of claim 12 wherein said shellfish comprises salted, fermented shrimp.

15. The method of claim 2 wherein said repellent composition comprises a mixture of lipoidal material containing said phospholipid and a water-miscible solvent for lipoidal material, said solvent being capable of dissolving the lipids in said lipoidal material.

16. The method of claim 15 wherein said lipoidal material comprises unputrefied egg.

17. The method of claim 16 wherein said egg comprises dried egg and said solvent comprises an alcohol.

18. The method of claim 17 wherein said alcohol comprises an alkanol having from 1 to 4 carbon atoms.

19. the method of claim 18 wherein said repellent composition further comprises a binder.

20. The method of claim 19 wherein said repellent composition further comprises water as a diluent.

21. The method of claim 20 wherein said repellent composition further comprises a solubilizing agent.

22. The method of claim 21 wherein said solubilizing agent comprises ammonium hydroxide.

23. The method of claim 1 wherein said phospholipid comprises cephalin.

24. The method of claim 1 wherein said phospholipid comprises lecithin.

25. The method of claim 1 wherein said phospholipid is derived from a plant source.

26. the method of claim 25 wherein said plant source is soy bean.

27. The method of claim 26 wherein said phospholipid comprises soy bean lecithin.

28. The method of claim 1 wherein said material is contacted with said repellent composition.

29. A method for discouraging entry by ruminants into an area of land containing material eaten by ruminants, said area having a peripheral portion through which said ruminants gain access to said area, comprising:

placing along at least a part of said peripheral portion an amount of repellent composition effective to discourage said ruminants from crossing said peripheral portion to gain access to said area, said repellent composition containing a phospholipid as an active repellent ingredient.

30. The method of claim 29 wherein said repellent composition is placed by contacting the edible material along at least a part of said peripheral portion with an effective amount of said repellent composition.

31. The method of claim 29 wherein said repellent composition is placed by contacting at least one piece of relatively inert material with said repellent composition, and positioning said piece of relatively inert material along at least a part of said peripheral portion, said piece of relatively inert material being capable of retaining thereon an amount of said repellent composition which when placed along said peripheral portion is effective to discourage ruminants from crossing said peripheral portion to gain access to said area.

32. The method of claim 30 wherein said piece of relatively inert material comprises a rope capable of being placed along at least part of said peripheral portion.

* * * * *